United States Patent
Lee et al.

(10) Patent No.: US 11,184,703 B2
(45) Date of Patent: Nov. 23, 2021

(54) DEVICE AND METHOD FOR SOUND LOCALIZATION

(71) Applicant: REALTEK SEMICONDUCTOR CORPORATION, Hsinchu (TW)

(72) Inventors: Ming-Tang Lee, Hsinchu (TW); Chung-Shih Chu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/149,214

(22) Filed: Jan. 14, 2021

(65) Prior Publication Data

US 2021/0227318 A1 Jul. 22, 2021

(30) Foreign Application Priority Data

Jan. 22, 2020 (TW) ................... 109102649

(51) Int. Cl.
*H04R 1/40* (2006.01)
*G10L 25/78* (2013.01)
*H04R 3/00* (2006.01)

(52) U.S. Cl.
CPC .................... *H04R 1/406* (2013.01)

(58) Field of Classification Search
CPC .... H04R 1/406; H04R 2430/23; H04R 3/005; G10L 25/78
USPC ....... 381/356, 150, 355, 181, 367, 122, 369, 381/92
See application file for complete search history.

(56) References Cited

U.S. PATENT DOCUMENTS

| | | | |
|---|---|---|---|
| 6,990,193 B2 | 1/2006 | Beaucoup et al. | |
| 8,233,352 B2 | 7/2012 | Beaucoup | |
| 8,918,319 B2 | 12/2014 | Hu et al. | |
| 10,042,038 B1* | 8/2018 | Lord | G10L 25/51 |
| 2002/0097885 A1 | 7/2002 | Birchfield et al. | |
| 2006/0227977 A1 | 10/2006 | Rui et al. | |

(Continued)

FOREIGN PATENT DOCUMENTS

TW 201250670 A1 12/2012

OTHER PUBLICATIONS

IEEE paper: "A high-accuracy, low-latency technique for talker localization in reverberant environments using microphone arrays".

(Continued)

*Primary Examiner* — Thjuan K Addy
(74) *Attorney, Agent, or Firm* — WPAT, PC

(57) ABSTRACT

A device for sound localization includes a spatial feature generator, a voice detector, an angle selector, and an angle retriever. The spatial feature generator generates M spatial feature signals according to signals of N microphones of a microphone array. The voice detector generates at least one voice detection signal according to at least one of the signals of the N microphones. The angle selector outputs a candidate angle signal according to the M spatial feature signals to indicate a candidate direction of sound. The angle retriever generates a sound detection result according to the M spatial feature signals to indicate whether any sound source exists, and then outputs an estimated angle signal indicative of a direction of sound according to the sound detection result, the at least one voice detection signal, and the candidate angle signal.

14 Claims, 4 Drawing Sheets

(56) References Cited

U.S. PATENT DOCUMENTS

2010/0110834 A1    5/2010  Kim et al.
2015/0156578 A1*   6/2015  Alexandridis ......... H04R 3/005
                                                       381/92

OTHER PUBLICATIONS

Text book: "Optimum Array Processing" (p. 428-709).
OA letter of the counterpart TW application (appl. no. 109102649 ) dated Oct. 16, 2020. Summary of the OA letter: Claims 1-3, 5-6, 8-9 are rejected as being unpatentable over the cited reference 1 (US2010/0110834A1) in view of the cited reference 2 (TW201250670A, also published as U.S. Pat. No. B2 8,918,319).

* cited by examiner

DEVICE AND METHOD FOR SOUND LOCALIZATION

BACKGROUND OF THE INVENTION

1. Field of the Invention

The present disclosure relates to a device and method for localization, especially for a device and method for sound localization.

2. Description of Related Art

A hands-free device or a conference device usually includes a microphone array. Such devices often use sound localization techniques for estimating a direction of sound, that is to say an incident angle of sound, and thereby enhances a sound collection effect.

A microphone array includes a plurality of microphones; these microphones are disposed separately, and thus a time difference between the time of a microphone receiving a sound signal of a sound source and the time of another microphone receiving a sound signal of the same sound source will exist. This time difference will vary as the incident angles of the sound signals change. A common sound localization technique uses the said time difference to measure spatial features indicative of incident angles of multiple sound signals, and then estimates an incident angle of sound according to the strengths of these spatial features. Several common techniques for spatial feature calculation are found in the following references:

Reference 1: J. H. DiBiase, "A high-accuracy, low-latency technique for talker localization in reverberant environments using microphone arrays", 2000.

Reference 2: H. L. Van Trees, "Optimum array processing—Part IV of detection, estimation, and modulation theory", Chapter 6, 2002.

In order to improve the accuracy of angle estimation in a noisy environment, before the calculation of spatial features or when determining an incident angle of sound, a voice detection technique is used as mentioned in the US application publication with publication number "US 2002/0097885 A1". However, the misjudgement probability of a voice detection technique usually increases as the strength of music noise, babble noise, or the like increases, and this will mislead the voice detection technique to determine a direction of noise as a direction of voice. In addition, the detection success rate of a voice detection technique usually decreases in a noisy environment, which prevents the voice detection technique to determine a direction of voice adequately.

Some prior art such as the US patent with patent number "U.S. Pat. No. 6,990,193 B2" discloses echo cancellation techniques; however, this does not solve the aforementioned problems.

SUMMARY OF THE INVENTION

An object of the present disclosure is to provide a device and method for sound localization. The device and method can determine a direction of sound adequately.

An embodiment of the device for sound localization of the present disclosure includes a spatial feature generator, a voice detector, an angle selector, and an angle retriever. The spatial feature generator is configured to generate M spatial feature signals according to signals of N microphones of a microphone array, wherein M and N are integers greater than one. The voice detector is configured to generate at least one voice detection signal according to at least one of the signals of the N microphones. The angle selector is configured to output a candidate angle signal indicative of a candidate direction of sound according to the M spatial feature signals. The angle retriever is configured to generate a sound detection result indicative of whether any sound source exists according to the M spatial feature signals, and to output an estimated angle signal indicative of a direction of sound according to the sound detection result, the at least one voice detection signal, and the candidate angle signal.

Another embodiment of the device for sound localization of the present disclosure also includes a spatial feature generator, a voice detector, an angle selector, and an angle retriever. The spatial feature generator is configured to generate M spatial feature signals according to signals of N microphones of a microphone array, wherein M and N are integers greater than one. The voice detector is configured to generate X voice detection signal(s) according to X spatial feature signal(s) of the M spatial feature signals, wherein X is a positive integer not greater than the M. The angle selector is configured to output a candidate angle signal indicative of a candidate direction of sound according to the M spatial feature signals. The angle retriever is configured to generate a sound detection result indicative of whether any sound source exists according to the M spatial feature signals, and to output an estimated angle signal indicative of a direction of sound according to the sound detection result, the X voice detection signal(s), and the candidate angle signal.

An embodiment of the method for sound localization of the present disclosure is performed by an angle retriever and includes the following steps: determining whether any sound source exists according to M spatial feature signals that are generated according to signals of N microphones of a microphone array, wherein M and N are integers greater than one; determining whether any voice exists according to at least one voice detection signal that is generated according to at least one of the signals of the N microphones or according to at least one of the M spatial feature signals; on condition that no sound source is found, outputting a candidate angle signal as an estimated angle signal, wherein the candidate angle signal is generated according to the M spatial feature signals and indicative of a candidate direction of sound; and on condition that at least one sound source is found and voice is found, storing the candidate angle signal in a storage circuit and outputting the candidate angle signal as the estimated angle signal; and on condition that at least one sound source is found but no voice is found, retrieving a pre-existing candidate angle signal from the storage circuit and outputting the pre-existing candidate angle signal as the estimated angle signal.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present disclosure provides a device and method for sound localization. The device and method can determine a direction of sound adequately.

Figure 1:
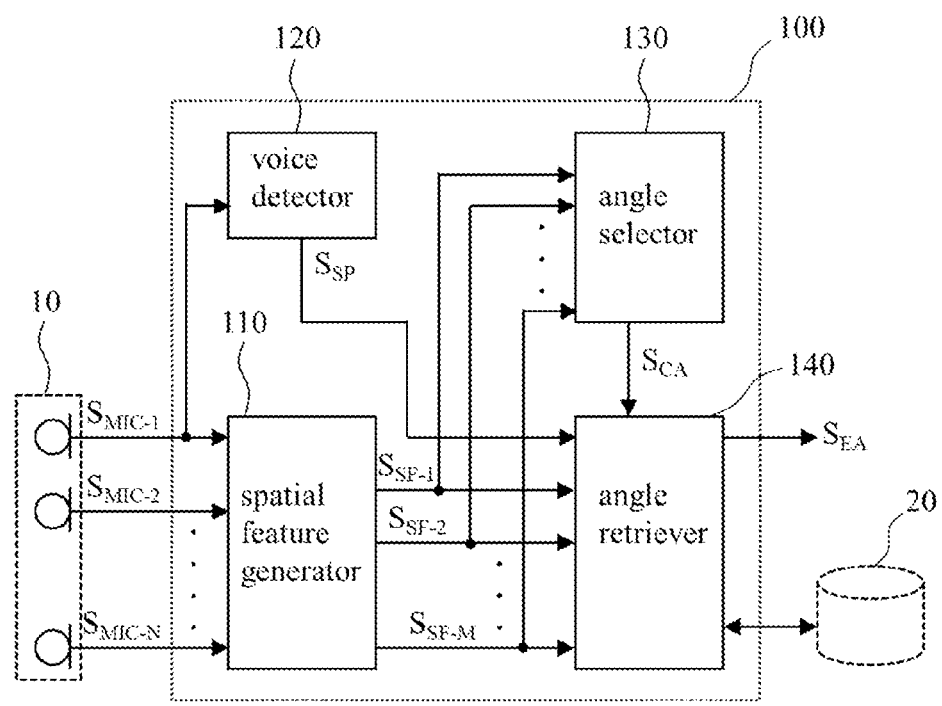
FIG. 1 shows an embodiment of the device for sound localization of the present disclosure.

FIG. 1 shows an embodiment of the device for sound localization of the present disclosure. The device 100 of FIG. 1 includes a spatial feature generator 110, a voice detector 120, an angle selector 130, and an angle retriever 140. The spatial feature generator 110 is configured to generate M spatial feature signals ($S_{SF-1} \sim S_{SF-M}$) according to M angles and signals of N microphones ($S_{MIC-1} \sim S_{MIC-N}$) of a microphone array 10, wherein M and N are the same or different integers greater than one. The voice detector 120 is configured to generate at least one voice detection signal ($S_{SP}$) according to at least one of the signals of the N microphones; more specifically, the voice detector 120 can detect human voice or other kinds of sound in accordance with the demand for implementation. The angle selector 130 is configured to output a candidate angle signal ($S_{CA}$) indicative of a candidate direction of sound according to the M spatial feature signals; for example, the angle selector 130 selects a spatial feature signal having a maximum value (i.e., a value representative of the maximum signal strength) from the M spatial feature signals and then output the corresponding angle of this spatial feature signal as the candidate angle signal. The angle retriever 140 is configured to generate a sound detection result indicative of whether any sound source exists according to the M spatial feature signals, wherein an example of the sound detection result is a signal of a hardware circuit or an algorithmic calculation result of software/firmware; afterward the angle retriever 140 outputs an estimated angle signal ($S_{EA}$) indicative of a direction of sound according to the sound detection result, the at least one voice detection signal, and the candidate angle signal.

Please refer to FIG. 1. The spatial feature generator 110 can use a known/self-developed technique to generate the M spatial feature signals. For example, the spatial feature generator 110 uses at least one of the following algorithms to generate the M spatial feature signals: a Steered Response Power (SRP) algorithm; a Generalized Cross Correlation (GCC) algorithm; and a Generalized Cross Correlation-Phase Transform (GCC-PHAT) algorithm. The introduction to the above-mentioned algorithms is found in the Reference 1 recited in paragraph [0003] of this specification. In addition, in order to improve the continuity of angle estimation, the spatial feature generator 110 can use a known/self-developed recursive algorithm to perform a smoothing process to the M spatial feature signals.

Please refer to FIG. 1. The voice detector 120 is configured to detect whether a signal having a specific feature (e.g., specific pitch or energy) and thereby generate the at least one voice detection signal. The voice detector 120 can be realized with a known technique (e.g., the technique described in the following website: https://en.wikipedia.org/wiki/Voice_activity_detection) or a self-developed technique.

Figure 2:
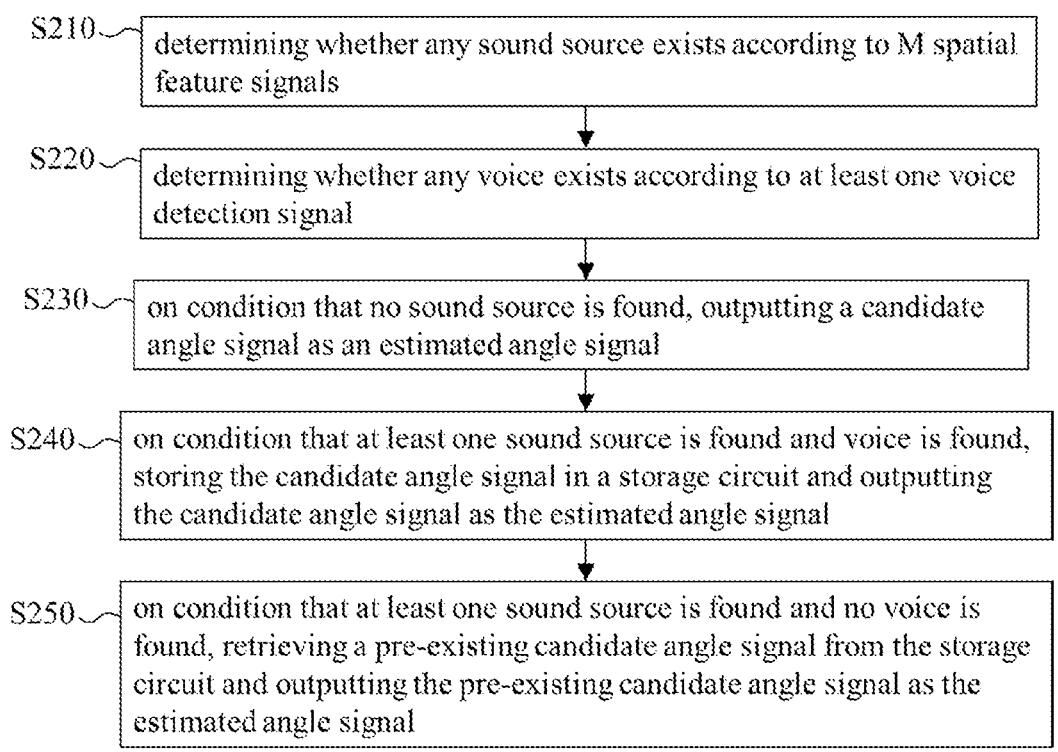
FIG. 2 shows an embodiment of multiple steps performed by the angle retriever of FIG. 1.

Please refer to FIG. 1. The angle retriever 140 performs multiple steps to output the estimated angle signal. An embodiment of the multiple steps is shown in FIG. 2, and includes:

S210: determining whether any sound source exists according to the M spatial feature signals and thereby generating a first decision signal. In an exemplary implementation, step S210 includes at least one of the following steps to determine whether any sound source exists: a first step for determining whether any sound source exists according to a maximum value of a spatial feature signal among the M spatial feature signals, an average of M values of the M spatial feature signals, and a first threshold; a second step for determining whether any sound source exists according to the maximum value, a minimum value of a spatial signal among the M spatial feature signals, and a second threshold; and a third step for determining whether any sound source exists according to the maximum value and a third threshold. For example, the first step includes determining whether the maximum value is greater than a product of the first threshold multiplied by the average value, and then determining that a sound source exists if the maximum value is greater than the product; the second step includes determining whether the maximum value is greater than a product of the second threshold multiplied by the minimum value, and then determining that a sound source exists if the maximum value is greater than the product; and the third step includes determining whether the maximum value is greater than the third threshold, and then determining that a sound source exists if the maximum value is greater than the third threshold. Those having ordinary skill in the art can set the first, second, and third thresholds in accordance with the demand for implementation.

S220: determining whether any voice exists according to the at least one voice detection signal and thereby generating a second decision signal.

S230: on condition that the first decision signal indicates that no sound source is found, outputting the candidate angle signal as the estimated angle signal.

S240: on condition that the first decision signal indicates that at least one sound source is found and the second decision signal indicates that voice is found, storing the candidate angle signal in a storage circuit 20 and outputting the candidate angle signal as the estimated angle signal.

S250: on condition that the first decision signal indicates that at least one sound source is found and the second decision signal indicates that no voice is found, retrieving a pre-existing candidate angle signal from the storage circuit 20 and outputting the pre-existing candidate angle signal as the estimated angle signal. The pre-existing candidate angle signal is generated by the device 100 previously.

Since those having ordinary skill in the art can use a known/self-developed technique to implement the angle retriever 140 according to the present disclosure, redundant description is omitted here.

Figure 3:
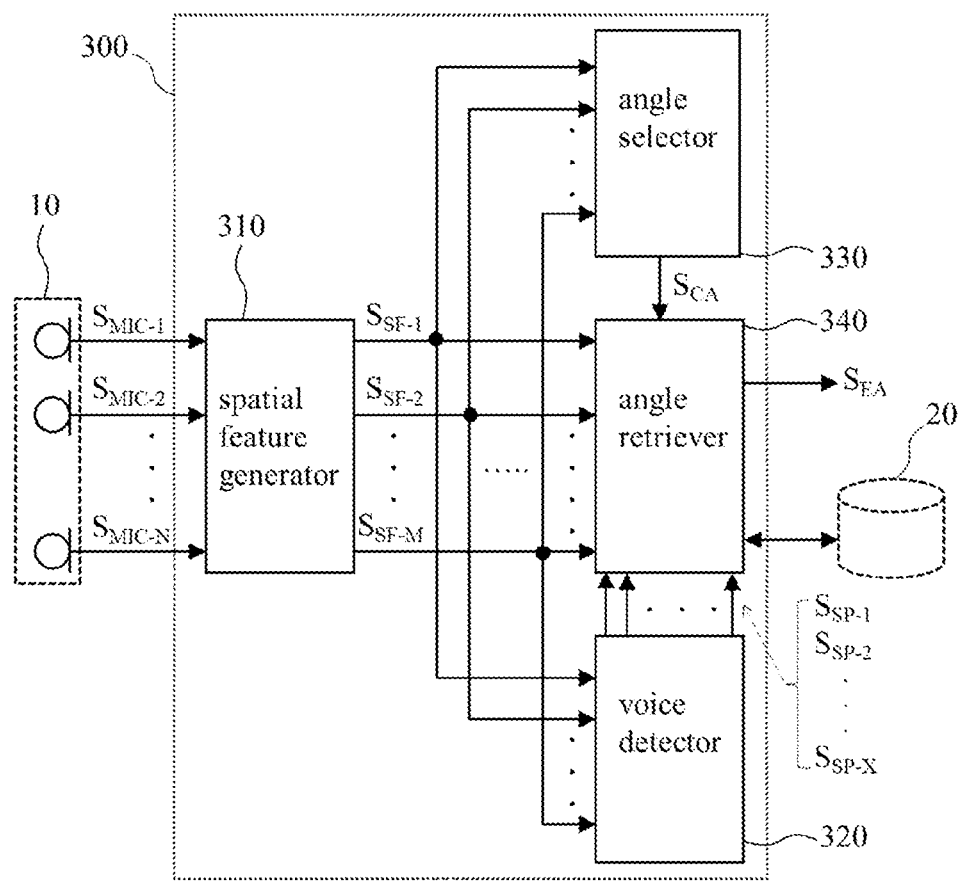
FIG. 3 shows another embodiment of the device for sound localization of the present disclosure.

FIG. 3 shows another embodiment of the device for sound localization of the present disclosure. The device 300 of FIG. 3 includes a spatial feature generator 310, a voice detector 320, an angle selector 330, and an angle retriever 340. The spatial feature generator 310 is configured to generate M spatial feature signals according to signals of N microphones of a microphone array, wherein M and N are integers greater than one. The voice detector 320 is configured to generate X voice detection signal(s) ($S_{SP-1} \sim S_{SP-X}$) according to X spatial feature signal(s) of the M spatial feature signals, wherein X is a positive integer not greater than the M. The angle selector 330 is configured to output a candidate angle signal indicative of a candidate direction of sound according to the M spatial feature signals. The angle retriever 340 is configured to generate a sound detection result indicative of whether any sound source exists according to the M spatial feature signals, and to output an estimated angle signal indicative of a direction of sound according to the sound detection result, the X voice detection signal(s), and the candidate angle signal.

Please refer to FIG. 3. In an exemplary implementation, the spatial feature generator 310 uses the aforementioned SRP algorithm to generate the M spatial feature signals. In an exemplary implementation, the voice detector 320 uses a known/self-developed technique capable of detecting whether a signal having a specific feature and thereby generates the X voice detection signals. In an exemplary implementation, the angle retriever 340 performs multiple steps to output the estimated angle signal. An embodiment of the multiple steps includes: determining whether any sound source exists according to the M spatial feature signals and thereby generating a first decision signal; determining whether any voice exists according to the X voice detection signal(s) and thereby generating a second decision signal; if the first decision signal indicates that no sound source is found, outputting the candidate angle signal as the estimated angle signal; if the first decision signal indicates that at least one sound source is found and the second decision signal indicates that voice is found, storing the candidate angle signal in a storage circuit and outputting the candidate angle signal as the estimated angle signal; and if the first decision signal indicates that at least one sound source is found and the second decision signal indicates that no voice is found, retrieving a pre-existing candidate angle signal from the storage circuit and outputting the pre-existing candidate angle signal as the estimated angle signal.

Since those having ordinary skill in the art can refer to the disclosure of the embodiments of FIGS. 1-2 to appreciate the detail and modification of the embodiment of FIG. 3, which means that the features of the embodiments of FIGS. 1-2 can optionally be applied to the embodiment of FIG. 3 in a logical way, repeated and redundant description is omitted here.

Figure 4:
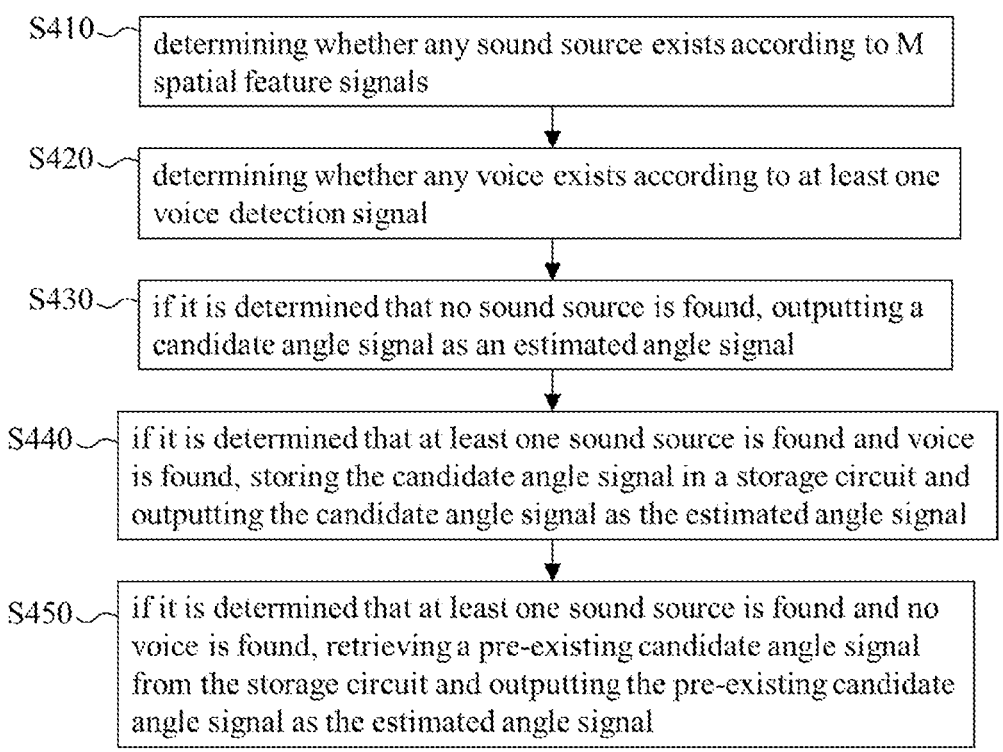
FIG. 4 shows an embodiment of the method for sound localization of the present disclosure.

FIG. 4 shows an embodiment of the method for sound localization of the present disclosure. This embodiment is performed by an angle retriever (e.g., the aforementioned angle retriever 140/340), and includes the following steps:

S410: determining whether any sound source exists according to M spatial feature signals that are generated according to signals of N microphones of a microphone array, wherein M and N are integers greater than one.

S420: determining whether any voice exists according to at least one voice detection signal that is generated according to at least one of the signals of the N microphones or generated according to at least one of the M spatial feature signals.

S430: if it is determined that no sound source is found, outputting a candidate angle signal as an estimated angle signal, wherein the candidate angle signal is generated according to the M spatial feature signals and is indicative of a candidate direction of sound.

S440: if it is determined that at least one sound source is found and voice is found, storing the candidate angle signal in a storage circuit and outputting the candidate angle signal as the estimated angle signal.

S450: if it is determined that at least one sound source is found but no voice is found, retrieving a pre-existing candidate angle signal from the storage circuit and outputting the pre-existing candidate angle signal as the estimated angle signal.

Since those having ordinary skill in the art can refer to the disclosure of the embodiments of FIGS. 1-3 to appreciate the detail and modification of the embodiment of FIG. 4, which means that the features of the embodiments of FIGS. 1-3 can optionally be applied to the embodiment of FIG. 4 in a logical way, repeated and redundant description is omitted here.

It should be noted that people having ordinary skill in the art can selectively use some or all features of any embodiment in this specification or some or all features of multiple embodiments in this specification to implement the present invention as long as such implementation is practicable, which implies that the way to implement the present invention can be flexible.

To sum up, the device and method for sound localization of the present disclosure can adequately determine a direction of sound with the operation of an angle retriever.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A device for sound localization, comprising:
  a spatial feature generator configured to generate M spatial feature signals according to signals of N microphones of a microphone array, wherein M and N are integers greater than one;
  a voice detector configured to generate at least one voice detection signal according to at least one of the signals of the N microphones;
  an angle selector configured to output a candidate angle signal indicative of a candidate direction of sound according to the M spatial feature signals; and
  an angle retriever configured to generate a sound detection result indicative of whether any sound source exists according to the M spatial feature signals, and to output an estimated angle signal indicative of a direction of sound according to the sound detection result, the at least one voice detection signal, and the candidate angle signal.

2. The device of claim 1, wherein the spatial feature generator uses at least one of following algorithms to generate the M spatial feature signals: a Steered Response Power (SRP) algorithm; a Generalized Cross Correlation (GCC) algorithm; and a Generalized Cross Correlation-Phase Transform (GCC-PHAT) algorithm.

3. The device of claim 1, wherein the spatial feature generator uses a recursive algorithm to perform a smoothing process to the M spatial feature signals.

4. The device of claim 1, wherein the angle retriever performs multiple steps to output the estimated angle signal, and the multiple steps includes:
  determining whether any sound source exists according to the M spatial feature signals and thereby generating a first decision signal;
  determining whether any voice exists according to the at least one voice detection signal and thereby generating a second decision signal;
  on condition that the first decision signal indicates that no sound source is found, outputting the candidate angle signal as the estimated angle signal;
  on condition that the first decision signal indicates that at least one sound source is found and the second decision signal indicates that voice is found, storing the candidate angle signal in a storage circuit and outputting the candidate angle signal as the estimated angle signal; and on condition that the first decision signal indicates that at least one sound source is found and the second decision signal indicates that no voice is found, retrieving a pre-existing candidate angle signal from the storage circuit and outputting the pre-existing candidate angle signal as the estimated angle signal.

5. The device of claim 4, wherein the step for determining whether any sound source exists includes at least one of following steps: a first step for determining whether any sound source exists according to a maximum value of a spatial feature signal among the M spatial feature signals, an average of M values of the M spatial feature signals, and a first threshold; a second step for determining whether any sound source exists according to the maximum value, a minimum value of a spatial signal among the M spatial feature signals, and a second threshold; and a third step for determining whether any sound source exists according to the maximum value and a third threshold.

6. The device of claim 5, wherein the first step includes determining whether the maximum value is greater than a product of the first threshold multiplied by the average value; the second step includes determining whether the maximum value is greater than a product of the second threshold multiplied by the minimum value; and the third step includes determining whether the maximum value is greater than the third threshold.

7. A device for sound localization, comprising:
a spatial feature generator configured to generate M spatial feature signals according to signals of N microphones of a microphone array, wherein M and N are integers greater than one;
a voice detector configured to generate X voice detection signal(s) according to X spatial feature signal(s) of the M spatial feature signals, wherein X is a positive integer not greater than the M;
an angle selector configured to output a candidate angle signal indicative of a candidate direction of sound according to the M spatial feature signals; and
an angle retriever configured to generate a sound detection result indicative of whether any sound source exists according to the M spatial feature signals, and to output an estimated angle signal indicative of a direction of sound according to the sound detection result, the X voice detection signal(s), and the candidate angle signal.

8. The device of claim 7, wherein the spatial feature generator uses a Steered Response Power (SRP) algorithm to generate the M spatial feature signals.

9. The device of claim 7, wherein the spatial feature generator uses a recursive algorithm to perform a smoothing process to the M spatial feature signals.

10. The device of claim 7, wherein the angle retriever performs multiple steps to output the estimated angle signal, and the multiple steps includes:
determining whether any sound source exists according to the M spatial feature signals and thereby generating a first decision signal;
determining whether any voice exists according to the X voice detection signal(s) and thereby generating a second decision signal;
on condition that the first decision signal indicates that no sound source is found, outputting the candidate angle signal as the estimated angle signal;
on condition that the first decision signal indicates that at least one sound source is found and the second decision signal indicates that voice is found, storing the candidate angle signal in a storage circuit and outputting the candidate angle signal as the estimated angle signal; and
on condition that the first decision signal indicates that at least one sound source is found and the second decision signal indicates that no voice is found, retrieving a pre-existing candidate angle signal from the storage circuit and outputting the pre-existing candidate angle signal as the estimated angle signal.

11. The device of claim 10, wherein the step of determining whether any sound source exists includes at least one of following steps: a first step for determining whether a maximum value of a spatial feature signal among the M spatial feature signals is greater than a product of a first threshold multiplied by an average of M values of the M spatial feature signals; a second step for determining whether the maximum value is greater than a product of a second threshold multiplied by a minimum value of a spatial feature signal among the M spatial feature signals; and the third step for determining whether the maximum value is greater than the third threshold.

12. A method for sound localization, the method performed by an angle retriever and comprising:
determining whether any sound source exists according to M spatial feature signals that are generated according to signals of N microphones of a microphone array, wherein M and N are integers greater than one;
determining whether any voice exists according to at least one voice detection signal that is generated according to at least one of the signals of the N microphones or generated according to at least one of the M spatial feature signals;
on condition that no sound source is found, outputting a candidate angle signal as an estimated angle signal, wherein the candidate angle signal is generated according to the M spatial feature signals and indicative of a candidate direction of sound;
on condition that at least one sound source is found and voice is found, storing the candidate angle signal in a storage circuit and outputting the candidate angle signal as the estimated angle signal; and
on condition that at least one sound source is found but no voice is found, retrieving a pre-existing candidate angle signal from the storage circuit and outputting the pre-existing candidate angle signal as the estimated angle signal.

13. The method of claim 12, wherein the step of determining whether any sound source exists includes at least one of following steps: a first step for determining whether any sound source exists according to a maximum value of a spatial feature signal among the M spatial feature signals, an average of M values of the M spatial feature signals, and a first threshold; a second step for determining whether any sound source exists according to the maximum value, a minimum value of a spatial signal among the M spatial feature signals, and a second threshold; and a third step for determining whether any sound source exists according to the maximum value and a third threshold.

14. The method of claim 13, wherein the first step includes determining whether the maximum value is greater than a product of the first threshold multiplied by the average value; the second step includes determining whether the maximum value is greater than a product of the second threshold multiplied by the minimum value; and the third step includes determining whether the maximum value is greater than the third threshold.

\* \* \* \* \*